United States Patent Office 2,727,066
Patented Dec. 13, 1955

2,727,066

MANUFACTURE OF ACONITIC ACID

Hoy A. Cranston, Oak Lawn, Ill., assignor to Daniel F. Kelly, Hammond, Ind., as trustee No Drawing. Application March 5, 1953,
Serial No. 340,665

3 Claims. (Cl. 260—537)

The present invention relates to the manufacture of aconitic acid from citric acid, and in particular to an improved process over that described in my U. S. Patent No. 2,566,172, issued on August 28, 1951.

In that patent a mixture of citric acid, water and alkane sulfonic acid is heated at reflux temperature at atmospheric pressure, whereby to effect a molecular dehydration of citric acid to form aconitic acid

HOOC.CH₂.C(COOH)=CH.COOH

Under the conditions described therein, referring in particular to the higher molar amount of water used in proportion to one mole of alkane monosulfonic acid and to one mole of citric acid, the said reaction did not take place below 120° C.

Further experience with the process has shown that increasing the amount of water requires an increase in the time and temperature for the reaction to take place; and the higher the temperature and the longer the time, the poorer is the yield and the greater is the loss of raw material by decomposition of either one or both of the citric acid and the aconitic acid.

The present invention aims to minimize such loss by decomposition and at the same time to simplify the process with high yield.

It is the general object of the invention to limit the proportions of the essential materials so that the reaction takes place at below 120° C. and in a time of not over 24 hours.

A particular object of the invention is to minimize the proportion of water.

Another object of the invention is to simplify the procedure and hence to limit the cost of apparatus necessary for commercial manufacture.

Various other and ancillary objects and advantages of the invention will appear from the following description and explanation.

The term alkane sulfonic acid as used herein signifies monosulfonic acid derivatives of a hydrocarbon selected from the group consisting of methane, ethane and propane. Commercially, such material is available as a mixture of all three derivatives, containing also 2 to 3% of water and about 3% of sulfuric acid. The latter is harmful as it leads to oxidation of the aconitic acid. The exact proportions of the three ingredients are variable, but unimportant. The supplier identifies a particular mixture by its average molecular weight, such as 110. The molecular weights of the three principal ingredients are as follows:

Methane monosulfonic acid _____ 95
Ethane monosulfonic acid _____ 109
n-Propane monosulfonic acid _____ 123

The 3% or other small quantity of sulfuric acid may be nullified by adding toluene, for example, at least 2.8 parts to 100 parts of the commercial product. The toluene is easily sulfonated by the sulfuric acid to add a corresponding amount of toluene sulfonic acid. The alkane sulfonic acid herein referred to is substantially free from sulfuric acid, for example, as a result of using toluene.

Citric acid (anhydrous) is insoluble in alkane sulfonic acid, but in mixtures of it with water, the citric acid may be dissolved at an elevated temperature. The present invention derives from experiments to determine those conditions which produce a high yield of aconitic acid in a time no longer than 24 hours, at a temperature below 120° C., and in a non-refluxing reaction mass, held static or slightly agitated.

In general, a solution consisting originally of citric acid, alkane sulfonic acid and water, is produced by elevating the temperature of the mixed ingredients until all the citric acid ingredient is dissolved. Then the mass is maintained at that temperature, while conversion to aconitic acid seemingly occurs. The contents "works" by a slight evolution of gas, resulting from side reactions of decomposition. A point is reached where a flash or rapidly growing crystallization suddenly begins to set the mass. Studies of it indicate that aconitic acid under these conditions readily forms a super-saturated solution up to a concentration or condition of high yield, which suddenly converts the reaction mass to a slush of crystals and liquor.

Then the mass may be filtered. Preferably, some water is added followed by cooling to thin the mass for facilitating filtration. The crystals are thus easily removed.

The mother liquor at 100° C. or otherwise thereabouts at the atmospheric pressure boiling point of water has air bubbled through it thereby to carry off the water and leave substantially non-aqueous alkane sulfonic acid. The liquor may be set aside and cooled, with resulting precipitation of residual crystals of citric and aconitic acids. Where the dehydrated liquor containing these acids is used for a second reaction its content of citric acid may count toward the content for the second reaction.

For the desired results of high yield in not over 24 hours and at temperatures below 120° C., the following proportions of materials should be used:

| | Moles |
|---|---|
| Alkane sulfonic acid | 2.25 |
| Citric acid (anhydrous) | 0.5 to 1 |
| Water, per mole of citric acid | 1 to 1.5 |

The foregoing corresponds to limiting compositions as follows:

| | A | | B | | C | | D | |
|---|---|---|---|---|---|---|---|---|
| | Moles | Mol. Percent | Moles | Mol. Percent | Moles | Mol. Percent | Moles | Mol. Percent |
| Alkane Monosulfonic Acid | 2.25 | 69.2 | 2.25 | 53 | 2.25 | 64.2 | 2.25 | 47.4 |
| Citric Acid | .5 | 15.4 | 1 | 23.5 | .5 | 14.3 | 1 | 21.1 |
| Water | .5 | 15.4 | 1 | 23.5 | .75 | 21.4 | 1.5 | 31.6 |

These compositions define a quadrilateral area on a trilinear chart.

The temperature at which the mixture becomes a homogeneous solution is the minimum temperature at which the mass is held for the reaction temperature, until crystallization has occurred.

A composition is preferred which has a reaction temperature in the range from 110° to 115° C. The composition D in 24 hours at 110° to 113° C. is a typical and preferred example.

The reaction slush is cooled to 100° C. and for mechanical convenience only, two moles of water are added for each mole of original citric acid. Slow cooling, as in 24 hours, to 30° C. produces large crystals which filter easily. Fast cooling, as in 6 hours, to 30° C. produces fine crystals less easily filtered. When filtered, a chemical yield of 80% is obtained.

The crude crystals are dissolved in water, treated with about 2% of carbon by weight based on the crystals, and filtered. The liquor is boiled down at about 100° C. and when crystals appear, it is slowly cooled to 25° to 30° C. and filtered. The white crystals are about 98% or more pure.

Using the conditions and proportions specified, high yields are obtained with a loss of citric acid in the vicinity of 2% to 3%.

The invention is not limited to and by the details given by way of illustration and explanation, and changes and modifications are contemplated as falling within the scope of the invention as expressed in the appended claims.

I claim:

1. The method which comprises heating a mixture to a temperature effecting homogeneous solution, said mixture consisting essentially of 2.25 moles of monosulfonic acid of hydrocarbon selected from the group consisting of methane, ethane and n-propane, from 0.5 to 1 mole of citric acid, and from 1 to 1.5 moles of water per mole of citric acid, maintaining the solution at a temperature in the range upwardly from said first-mentioned temperature and below 120° C. for a period not over 24 hours and until a crystallization of aconitic acid takes place, and recovering aconitic acid from the mass.

2. The method which comprises heating a mixture to a temperature effecting homogeneous solution, said mixture consisting essentially of 2.25 moles of monosulfonic acid of hydrocarbon selected from the group consisting of methane, ethane and n-propane, 1 mole of citric acid, and 1.5 moles of water per mole of citric acid, maintaining the solution at a temperature in the range upwardly from said first-mentioned temperature and below 120° C. for a period not over 24 hours and until a crystallization of aconitic acid takes place, and recovering aconitic acid from the mass.

3. The method which comprises heating a mixture to a temperature effecting homogeneous solution, said mixture consisting of solvent material and solute material, the solvent material consisting essentially of water and 2.25 moles of monosulfonic acid of hydrocarbon selected from the group consisting of methane, ethane and n-propane, the solute material comprising essentially and predominantly from 0.5 to 1 mole of citric acid, the said water being present in the amount of 1 to 1.5 moles per mole of citric acid, the said mixture including solvent, citric acid and aconitic acid from mother liquor of a like reaction resulting from recovery of crystals of aconitic acid, maintaining the solution at a temperature in the range upwardly from said first-mentioned temperature and below 120° C. for a period not over 24 hours and until a crystallization of aconitic acid takes place, and recovering aconitic acid from the mass.

References Cited in the file of this patent

UNITED STATES PATENTS 2,566,172   Cranston _____ Aug. 28, 1951